(12) United States Patent
Smith (10) Patent No.: US 6,502,540 B1
(45) Date of Patent: Jan. 7, 2003

(54) INTERNAL COMBUSTION ENGINE GAS FLOW CONTROL

(76) Inventor: Alvin J. Smith, 4379 Modoc Rd., Santa Barbara, CA (US) 93110

( * ) Notice: Subject to any disclaimer, the term of this patent is extended or adjusted under 35 U.S.C. 154(b) by 59 days.

(21) Appl. No.: 09/633,648

(22) Filed: Aug. 7, 2000

Related U.S. Application Data (63) Continuation-in-part of application No. 09/232,245, filed on Jan. 19, 1999.

(51) Int. Cl.[7] ................................................ F02B 17/00
(52) U.S. Cl. ....................................... 123/295; 123/279
(58) Field of Search ........................ 123/193.6, 184.24, 123/184.42, 184.47, 184.53, 184.59, 262, 263, 276, 279, 310, 285, 294, 295, 299; 60/311

(56) References Cited

U.S. PATENT DOCUMENTS

| | | |
|---|---|---|
| 1,169,969 A | 2/1916 | Lake |
| 1,781,039 A | 11/1930 | Treiber |
| 1,817,382 A | 8/1931 | Kreis |
| 1,851,601 A | 3/1932 | Swan |
| 2,028,760 A | 1/1936 | Dillstrom |
| 2,151,698 A | 3/1939 | Harper, Jr. |
| 2,638,081 A | 5/1953 | Spannhake |
| 2,699,160 A | 1/1955 | McDuffie |
| 2,740,389 A | 4/1956 | Reyl |
| 2,966,145 A | 12/1960 | Froehlich |
| 3,132,633 A | 5/1964 | Zimmerman |
| 3,845,746 A * | 11/1974 | Elsbett .................. 123/184.42 |
| 3,999,532 A | 12/1976 | Kornhauser |
| 4,119,067 A * | 10/1978 | Aldrich et al. ......... 123/184.42 |
| 4,183,343 A | 1/1980 | Tanahashi et al. |
| 4,228,769 A | 10/1980 | Gartner et al. |
| 4,344,407 A | 8/1982 | Konishi et al. |
| 4,653,440 A | 3/1987 | Fukuhara |
| 4,664,075 A | 5/1987 | Poulos |
| 4,719,789 A | 1/1988 | Kato et al. |
| 4,760,819 A * | 8/1988 | Vorum .................... 123/184.42 |
| 5,012,770 A | 5/1991 | Okamoto et al. |
| 5,181,491 A | 1/1993 | Izumi et al. |
| 5,220,889 A | 6/1993 | Ampferer et al. |
| 5,390,634 A | 2/1995 | Walters et al. |
| 5,445,135 A | 8/1995 | Feuling |
| 5,699,766 A | 12/1997 | Saito |
| 5,706,778 A | 1/1998 | Kapus |
| 5,713,322 A | 2/1998 | Mausner et al. |
| 5,813,385 A | 9/1998 | Yamauchi et al. |
| 5,862,789 A | 1/1999 | Chaouche et al. |

\* cited by examiner

*Primary Examiner*—John Kwon
(74) *Attorney, Agent, or Firm*—William W. Haefliger (57) ABSTRACT

In an internal combustion engine having multiple cylinders, each cylinder defining a cylinder wall, and having a cylinder head, there being a piston movable axially within each cylinder to define a combustion zone between the piston top and the cylinder head, each cylinder having intake porting, the combustion comprising a manifold for delivering air to said combustion zones, via the intake porting at each cylinder, the manifold including air induction ducts, which are configured with branching to deliver substantially the same quantity of gas to each said porting.

10 Claims, 9 Drawing Sheets

INTERNAL COMBUSTION ENGINE GAS FLOW CONTROL

This application is a continuation-in-part of Ser. No. 09/232,245, filed Jan. 19, 1999.

BACKGROUND OF THE INVENTION

This invention relates generally to improvements in internal engine combustion, and more particularly to improvements in control of combustion gas flow in combustion chambers, and also to equalization of air or gas (fuel and air mixture) supply to the multiple combustion chambers in an engine.

There is need for such improvements in combustion gas flow within combustion chambers, and for distribution of pressurized air in equal quantities to such combustion chambers, for example to obtain better efficiency, greater power output, and smoother running of engines and reduced emissions.

SUMMARY OF THE INVENTION

It is a major object of the invention to provide such improvements, as referred to.

Basically, the invention is embodied in an internal combustion engine that has multiple cylinders, each cylinder defining a cylinder wall, and having a cylinder head, there being a piston movable axially within each cylinder to define a combustion zone between the piston top and the cylinder head, each cylinder having intake porting. In this combination the invention provides:

a) a manifold for delivering air to said combustion zones, via the intake porting at each cylinder, b) said manifold including gas induction ducts, which are configured with branching to deliver substantially the same quantity of air to each said porting.

As will be seen, the ducts typically include branches, each branch supplying gas such as air to two of the intake ports.

In this regard, a standard 6-cylinder engine will have each cylinder receiving different amounts of air, when the air manifold is supplied with air at one entry point. The normal engine is supplied with 10 to 15 percent over supply of fuel in order to supply sufficient combustible mixture to all cylinders.

In the present invention, when the air supply from a turbocharger is changed from one supply duct or tube to three supply tubes, the manifold is considered as looped. One air supply duct or tube will supply air to two valves. Each valve will receive the same amount of air at the same air pressure under these conditions.

With the looped induction system used in an engine, all intake valves at the cylinders receive the same amount of air. The fuel supply can be reduced from the 10 to 15 percent over supply level to the exact (reduced) amount needed for stoichiometric fuel mixture. This does away with the rich and lean areas associated with the over supply of fuel.

Accordingly, another object is to provide an engine device blower, or turbocharger, delivering air to multiple of such ducts, each duct supplying air to at least two of intake ports.

Further, where there are six of such ports, three manifold ducts (each receiving the same amount of air) are caused to branch so that two branches from each of the three ducts delivers air to two of the ports, respectively. Such ducts have equal lengths, and the branches also have equal (shorter) lengths.

Multiple of such cylinders, heads, pistons, and dished recesses may typically be provided in the engine, each recess having an axial cross-section of substantially parabolic shape. Such an engine may be of Diesel type or of spark combustion type, as will be seen.

If of Diesel type, the engine typically has at least one fuel injector oriented to inject fuel into the combustion zone and toward the parabolic recess, whereby combustion explosion of the injected fuel causes combustion gases to be received by that recess and to be directed generally axially, as aforesaid. The recess may then be in the piston top, in the path of injected fuel flow. Two or more of such recesses may be employed in the piston top, as will be seen.

Another object is to provide a second dished recess in the other of the piston top and head, and configured to receive and direct gases at the time of compression and combustion to flow generally axially toward said one of the piston top and head. The second recess is also typically of substantially parabolic shape in axial cross-section.

If the engine employs spark plugs for ignition, the electrodes are located in the paths of combustion gas flow from the dished parabolic recesses, as will be seen.

These and other objects and advantages of the invention, as well as the details of an illustrative embodiment, will be more fully understood from the following specification and drawings, in which:

DETAILED DESCRIPTION

Figure 1:
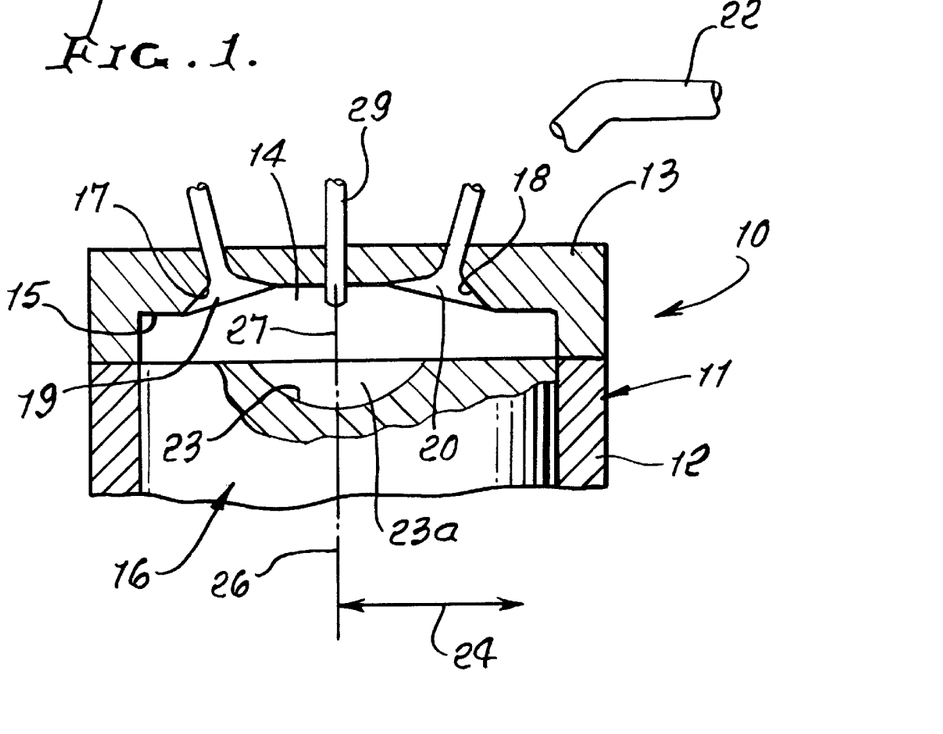
FIG. 1 is a section taken vertically and axially through an internal combustion engine cylinder and piston, and showing a parabolic recess.

FIG. 1 shows an internal combustion engine 10 having a cylinder 11 defining a cylinder wall 12. A cylinder head 13 extends over the combustion chamber 14, and the head has an inner surface 15 exposed to 14. A piston 16 reciprocates up and down in the direction of a central axis 26. The head has ports 17 and 18 for inflow of intake air, and for outflow of gaseous combustion products. Valves 19 and 20 are located at the ports and movable to open and close the ports to control such flow in timed relation to piston reciprocation, as is well know. The engine is further characterized by:
 a) manifold means for delivering air to the combustion zone,
 b) at least one of the piston top and the head defining a first dished recess configured to receive and direct gases at the time of combustion to flow generally axially toward the other of the piston top and head Intake manifold ducting appears at 22. In this example, the first dished recess, operating as referred to, is seen at 23, in the piston top. Preferably, the recess 23 is parabolic, either laterally in the direction 24, or in a lateral direction normal to 24, or in both lateral directions, or all lateral directions about axis 26. The focus of the parabola shown appears at 27. The parabolic surface 23a of the recess 23 causes the gaseous pressure waves, received as during combustion, to travel back upwardly with increased axial direction, i.e. the waves travel with increased straightening, to achieve better mixing and burning of the air and fuel. Fuel is typically injected as at 29 generally toward the focus 27, so that combustion waves at or near the focus traveling toward parabolic surface 23a will be reflected axially or generally axially upwardly.

The parabola can be designed to direct the reflected air energy to any point in the cylinder that is needed.

Combustion noise can be further reduced, by provision of a piston combustion chamber that uses two different recesses parabolic surfaces have two focal points. The two different sine waves produced upon reflection of combustion gases at the two parabolic surfaces will tend to cancel each other out and give a very quiet running Diesel is engine. The first parabola is typically a very shallow curve, the purpose of which is to direct more gases axially straight up the cylinder without bouncing off the cylinder walls.

Figure 2:
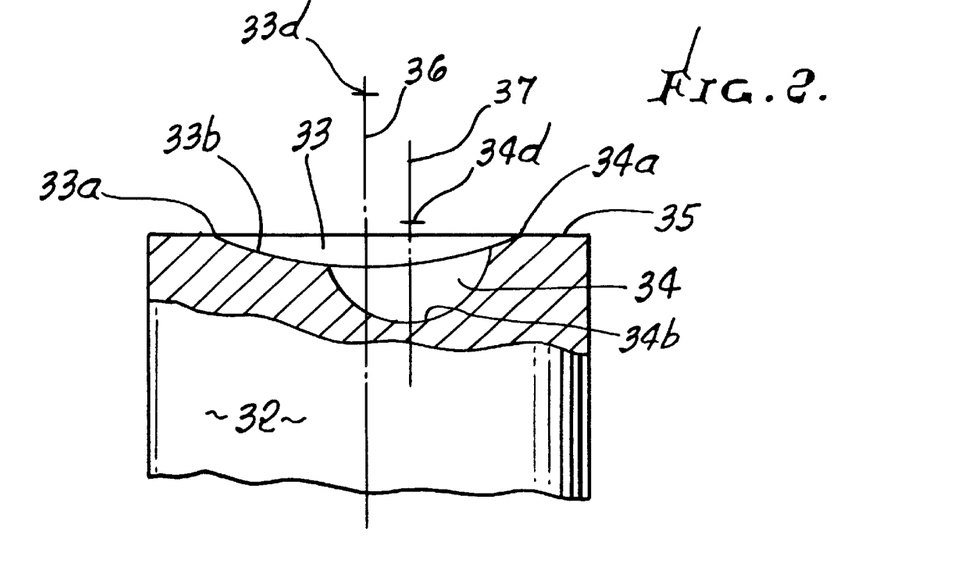
FIG. 2 is a section taken vertically and axially through a piston, showing dual parabolic recesses.

FIG. 2 shows a piston 32 having dual. parabolic recesses 33 and 34 at its top surface 35 exposed to the combustion chamber 37. Recess 33 intersects surface 35, at 33a which maybe circular about central axis 36. Recess 34 intersects the inner parabolic surface 33b of the recess 33, at 34a, which may be circular about central axis 37 of recess 34. Axis 37 is offset from axis 36. The focal points 33d and 34d of the two parabolic recesses are offset in the axial direction, and laterally, so as to cause the waves reflected generally axially from the parabolic surfaces 33b and 34b to tend to cancel one another, reducing engine noise. This is important for Diesel engines. The cylinder and valves appear at 133, 134 and 135.

The second parabola is designed to give the exact dimensions to give the proper compression ratio for the engine. The squish band is shown at 39.

Figure 2A:
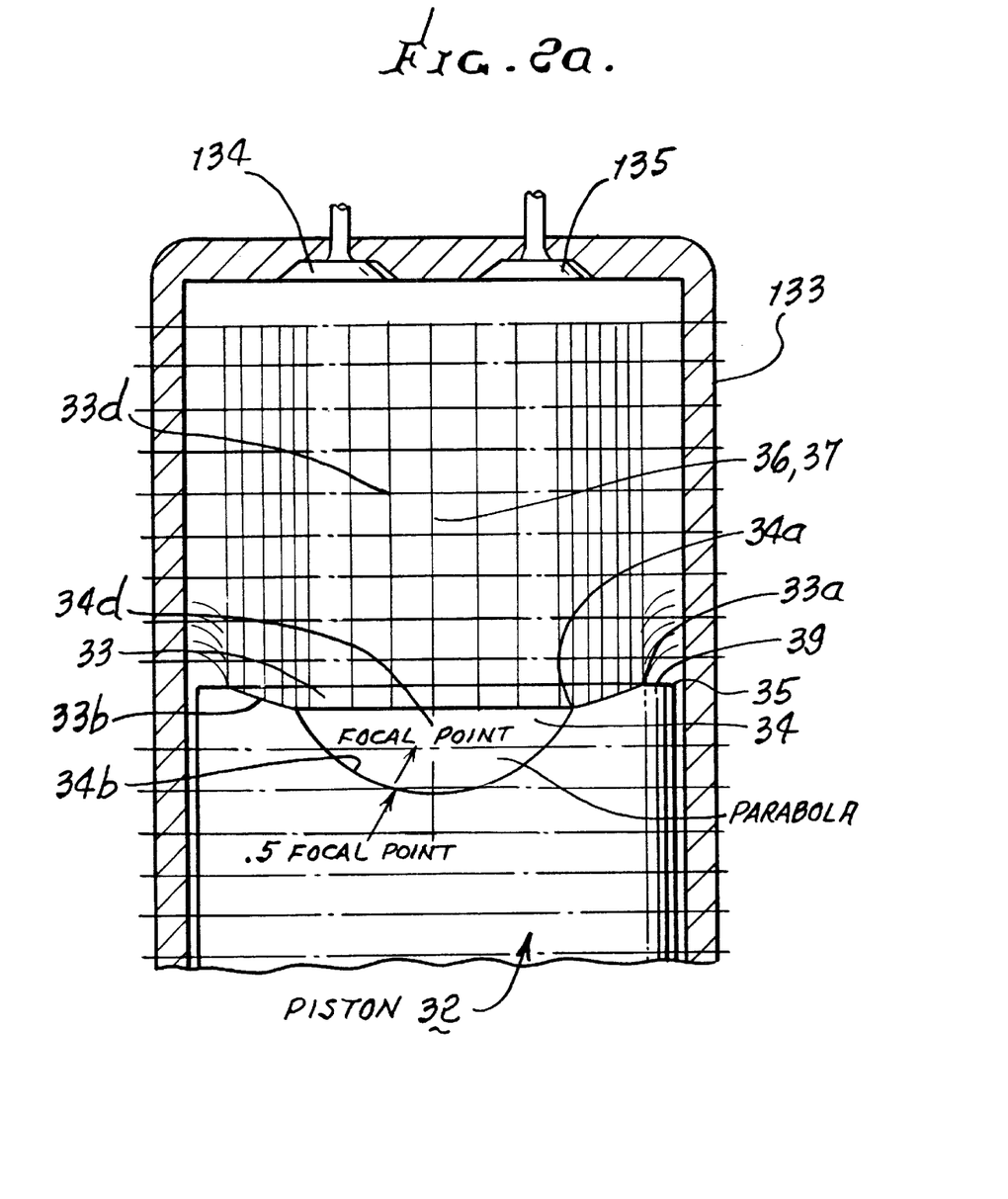
FIG. 2a is like FIG. 2, but shows a modification.

FIG. 2a is like FIG. 2, but the two parabolas are co-axial.

The parabola 34b can take up to 60% of bore for best power and can be dimensioned to take up to 30% of bore, to lower emission even more.

Other type engines can also use parabola pistons and heads. For example, the combustion chambers on two-valve gasoline engines can use such parabolas (three parabolas).

Four-valve engines can also use the parabola on a concave piston (using the stroke axis as the focal point).

Figure 3:
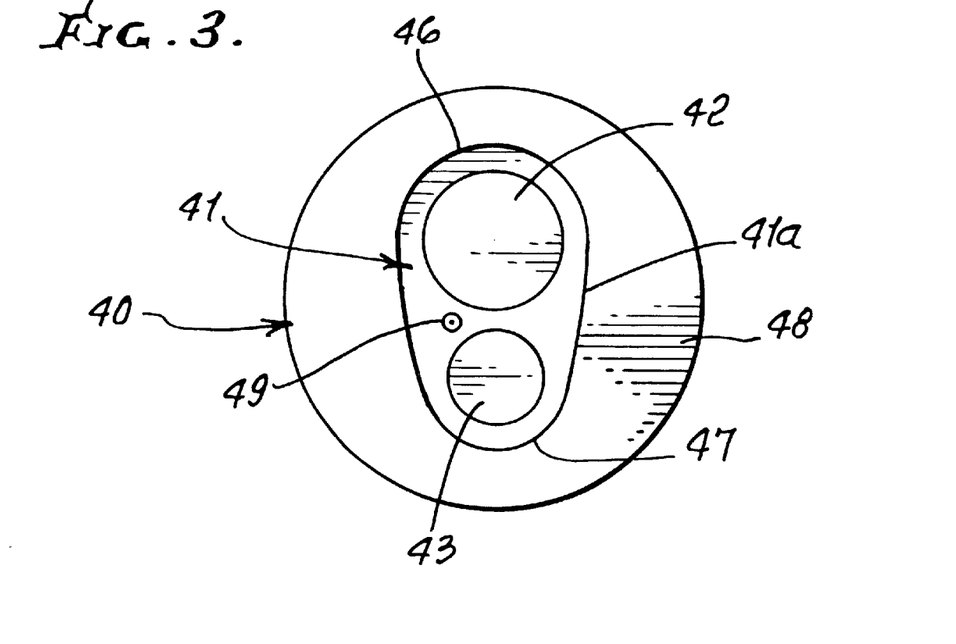
FIG. 3 is a top plan view of a cylinder head showing provision of a pear shaped or oblong recesses outline, the recess being parabolic in elevation and in a direction that bisects dual valves.

FIG. 3 shows an example of an engine cylinder head 40 having parabolic recessing. The parabolic recess 41 shown is pear shaped, as defined by recess edge 41a to accommodate two valves 42 and 43, one of which may be for air-fuel mixture intake, and the other for discharge of combustion products. The recess 41 is parabolic between points 46 and 47 of intersection with the flat surface (squish band) 48 of the head, surrounding the recess 41. A spark plug is shown as located at 49. Such a parabolic recess in the head tends to reflect combustion gas compression waves generally axially toward the piston, for higher engine efficiency.

Certain new engines have four-valves per cylinder. These engines are relatively smaller, produce good horsepower, but gas fuel consumption mileage is the same as larger pear-shaped older engines. The new engines do not have the torque of the older engines and the new engines horsepower is limited as the castings are not strong enough to withstand 650 to 750 HP.

Figure 4:
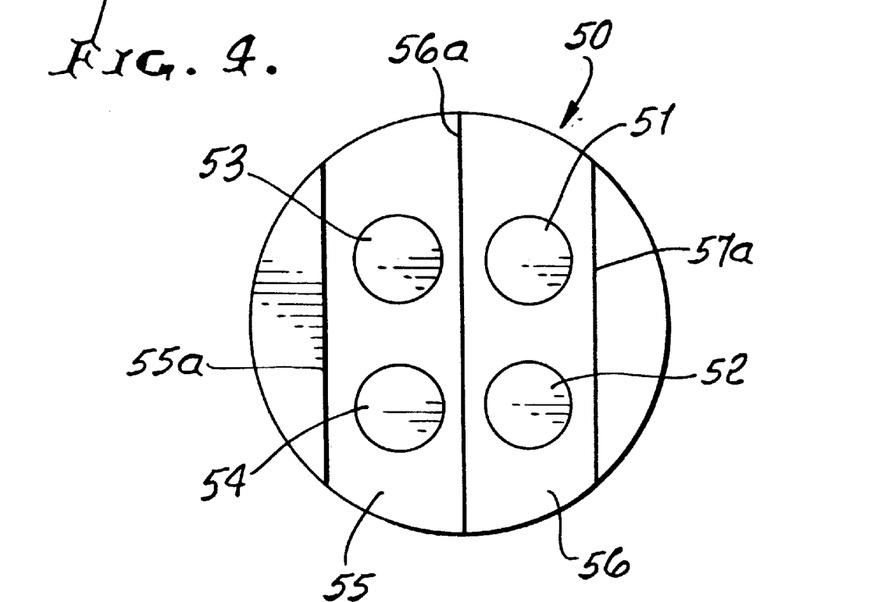
FIG. 4 is a top plan view of a cylinder head showing four valves usable with a piston having a central parabolic recess as in FIG. 1 or recesses as in FIG. 2.

FIG. 4 shows an example of a four-valve head 50, for use with a piston having a top recess, as in FIG. 1. Note valves 51–54 in head surface 55, and a central spark plug location. Parabolic recess elongated regions appear at 55 and 56, one between lines or planes 55a and 56a, and the other between 56a and 57a, which are parallel.

Figure 5:
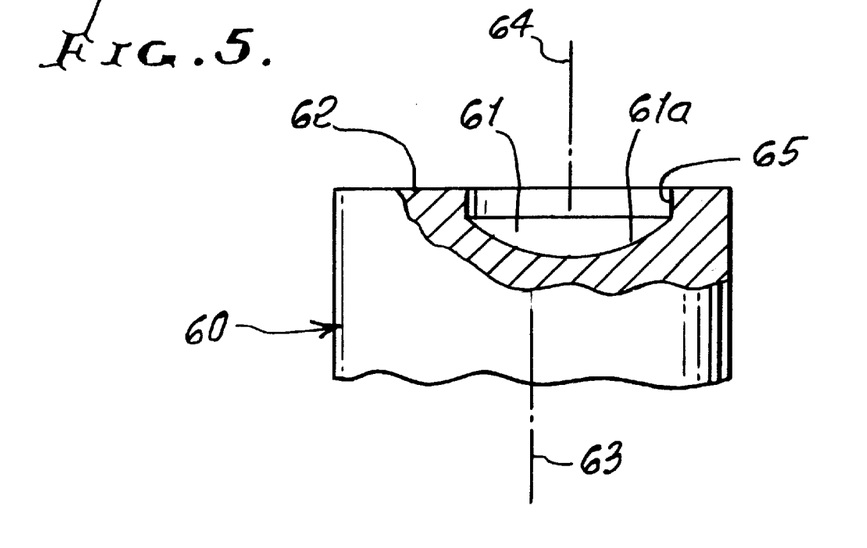
FIG. 5 is a view like FIG. 2, showing a parabolic recess in a piston, the recess offset relative to the piston axis.

FIG. 5 shows a piston in 60 axial section, with a parabolic recess 61 sunk in the piston top 62. The recess is offset relative to the piston axis 63. See recess axis 64. Recess parabolic surface 61a is everywhere spaced below top 62, and the recess periphery intersects annular wall 65 that extends generally axially, and about axis 64, and that tends to further confine the pressure waves reflected by the parabolic surface 61a, to travel axially. The recess axis 64 is parallel to and offset relative to axis 63.

Figure 6:
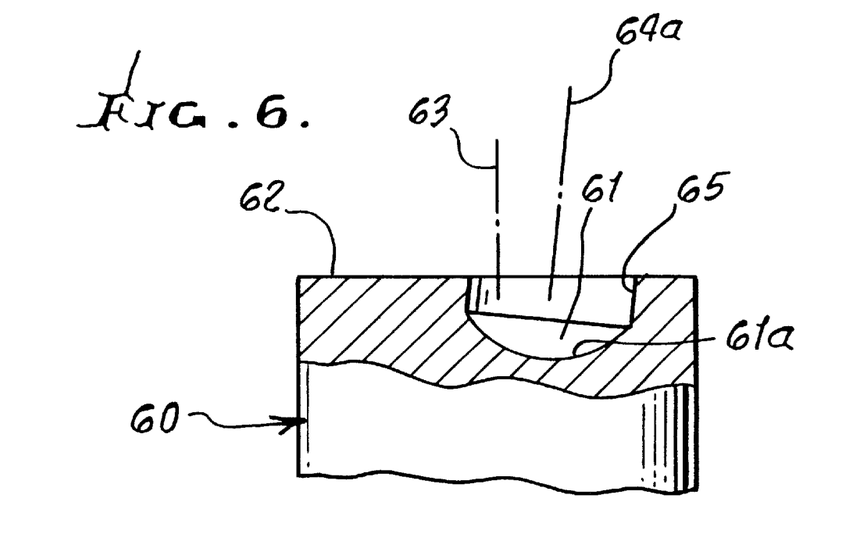
FIG. 6 is a view like FIG. 5, showing the offset recess tilted relative to the piston axis.

FIG. 6 is like FIG. 5, and bears the same identifying numbers; however, the parabolic recess axis 64a is angled relative to axis 63 (see angle α), and directed to the side 60a of the piston 60 closest to recess 61.

Parabola formulas are as follows:

| Parabola Formulas | |
|---|---|
| Piston Combustion Chamber | Piston Parabola |
| $F = .5"$ | $F - 3.2"$ |
| $x^2 = y4F$ | |
| $y = \dfrac{x^2}{4f}$ | |
| $y = \dfrac{x^2}{4 \times .5}$ | $y = \dfrac{x^2}{4 \times 3.2}$ |
| Volume of Parabola | |
| $V = \frac{1}{2}\pi \times a^2 \times H$ | a = radius at parabola<br>H = height |

Piston Combustion Chamber Parabola 2.4" diameter

Focal Length 0.5"

Piston Shape Parabola—Piston 4" Diameter

Parabola 3.50" diameter

Focal Length 3.2"

Focal Volume of Piston Parabola and Combustion Chamber 45.5 c.c.=2.78 cu inches

| Combustion Chamber Parabola | | Piston Parabola | |
|---|---|---|---|
| $F - .5$ | | $F - 3.2$ | |
| $y = x^2$ | | $y = x^2$ | |
| $4 \times .5$ | | $4 \times 3.2$ | |
| x | y | x | y |
| .1 | .005 | .1 | .00078 |
| .2 | .02 | .2 | .003 |
| .3 | .045 | .3 | .007 |
| .4 | .08 | .4 | .0125 |
| .5 | .125 | .5 | .0195 |
| .6 | .180 | .6 | .028 |
| .7 | .245 | .7 | .038 |
| .8 | .320 | .8 | .05 |
| .9 | .405 | .9 | .063 |
| 1.0 | .500 | 1.0 | .078 |
| 1.1 | .600 | 1.1 | .0945 |
| 1.2 | .720 | 1.3 | .132 |
| | | 1.5 | .1757 |
| | | 1.6 | .200 |
| | | 1.7 | .2257 |
| | | 1.75 | .2392 |

Volumes of Piston and Combustion Chamber Piston Combustion Chamber Volume (Parabola)

| | | |
|---|---|---|
| $V + \frac{1}{2} \pi a^2 H$ | | |
| $F = .5$ | | a = radius of parabola |
| $V - \frac{1}{2} 3.14 \times (1.2)^2 \times .72$ | | H = height of parabola |

| Piston Parabola - Volume | |
|---|---|
| $F - 3.2$ | |
| $V = \frac{1}{2} 3.14 \times (1.75)^2 \times .2392$ | |
| $V - 1.5$ cu. inches | |
| $F = .5$ | $V = 1.63$ cu. inches |
| $F - 3.2$ | $V - 1.15$ cu. inches |

Total Volume=2.78 cu. inches or =45.5 cu. Cm.

Figure 7:
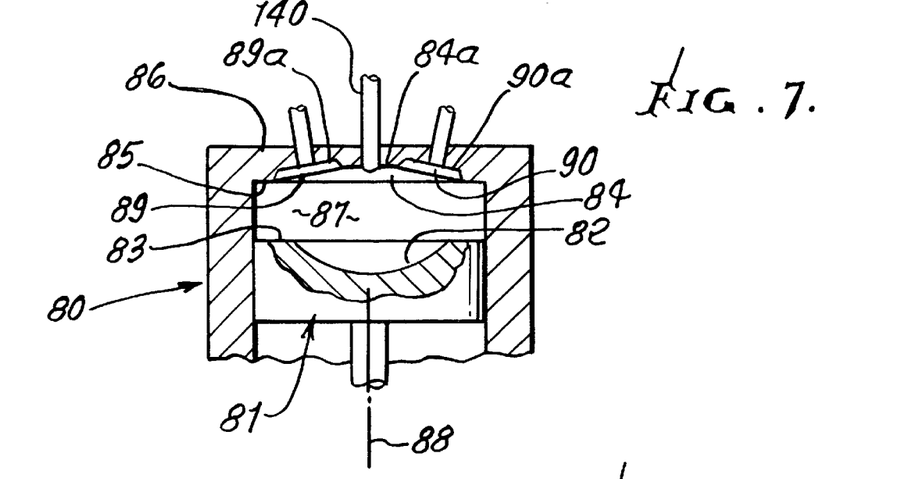
FIG. 7 is a vertical axial section showing a central parabolic recess in the piston, and a central parabolic recess in the head, with two valves at the top of the parabolic recess in the head.

FIG. 7 shows a cylinder 80 and piston 81. A shallow parabolic recess 82 is formed in the piston top 83. A shallow parabolic recess 84 is also sunk in the inner surface 85 of the cylinder head 86. Both recesses are directed toward the combustion chamber 87, and assist one another in directing pressurized combustion product waves generally axially, in the direction of axis 88. Intake and discharge valves 89 and 90 are located at ports 89a and 90a in the parabolic surface 84a of 84. Fuel is injected at 140.

Figure 8:
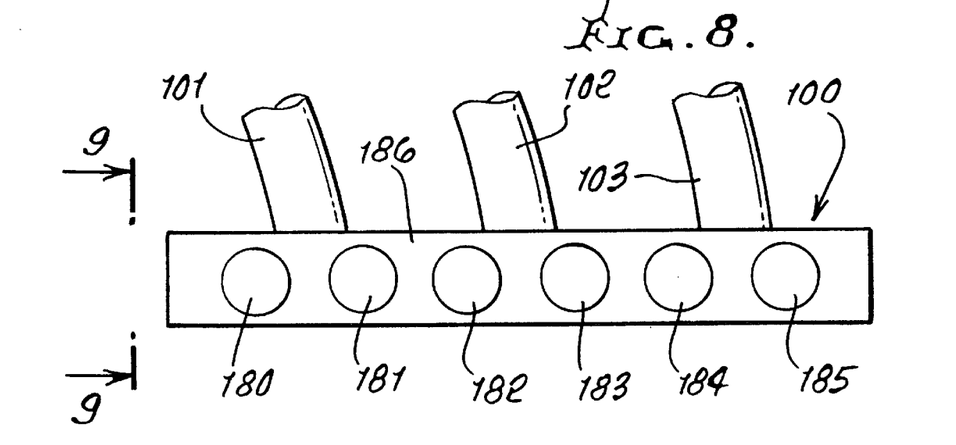
FIG. 8 is a side elevation view of multiple manifold ducts leading to intake valving.
Figure 9:
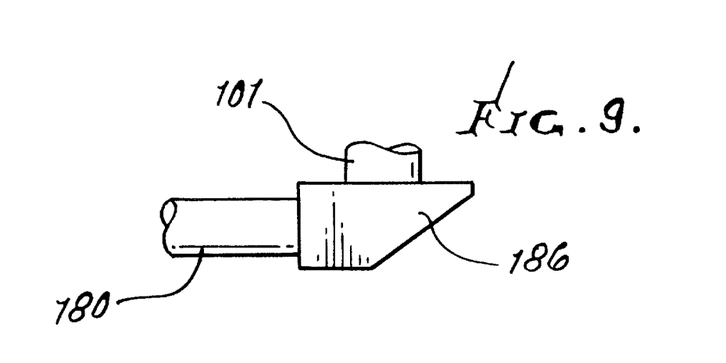
FIG. 9 is an end view of the FIG. 8 ducting.

FIGS. 8 and 9 show the provision of manifold means 100 including multiple ducts 101–103 located to deliver equal quantities of air (or air-fuel mixture) to intake valves, as referred to. Such tubes maybe looped. Intake ports appear at 150–155, in casting 156. Such equalization of air delivery is preferred.

Induction manifolds typically do not deliver the same amount of air to each cylinder. This is evidenced by the fact that the fuel supplied to each cylinder (injected into the engine) is 10 to 15% rich in order to cover all lean and rich running cylinders in the engine.

Installing the looped induction manifold will eliminate this problem. Each cylinder will receive the same amount of air in each cylinder. Fuel injection can be cut back by 10 to 15%. In turn, CO, HC and NOX will be reduced by the same amount.

Figure 10:
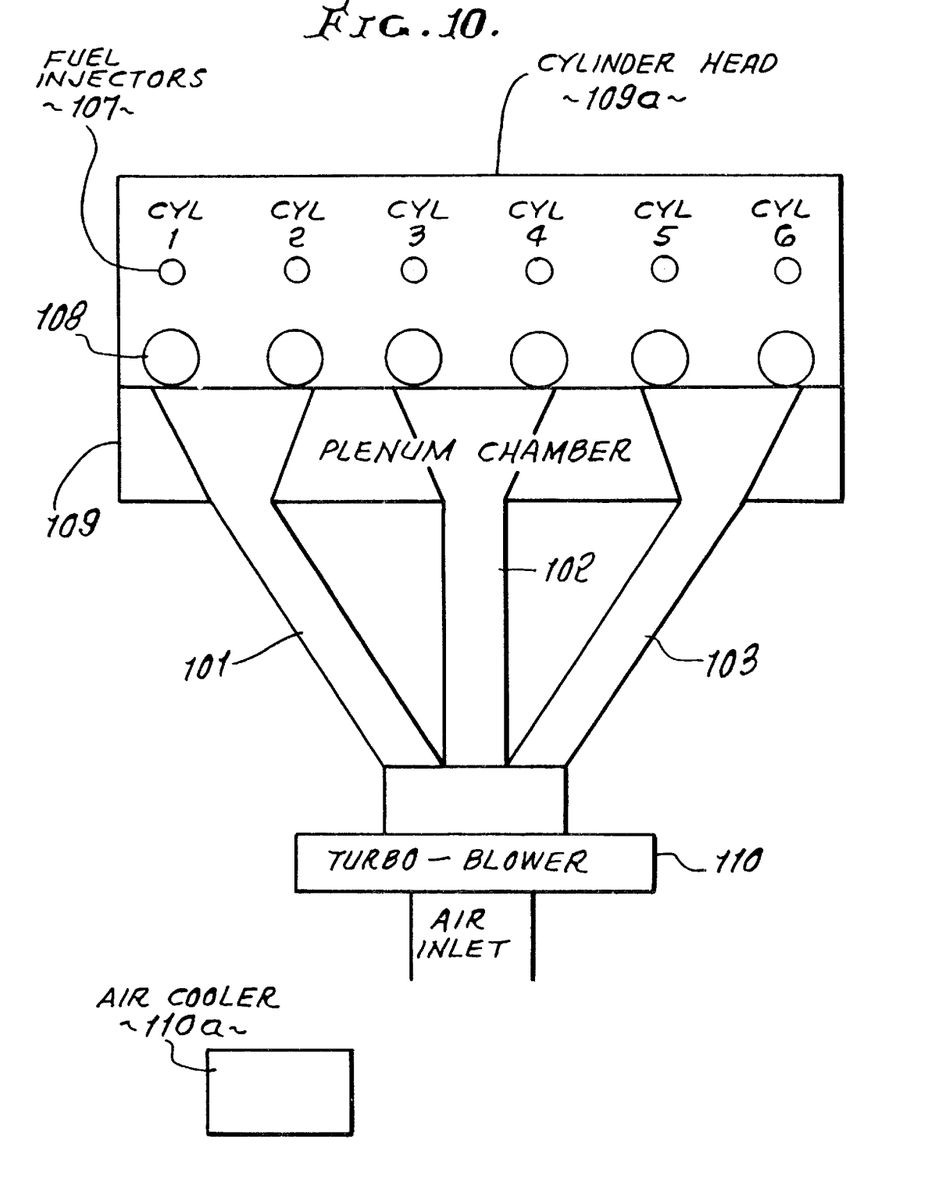
FIG. 10 is a schematic plan view showing a complete air induction system.

FIG. 10 schematically shows a modified preferred system. A blower 110 delivers equal amounts of pressurized air to ducts 101–103 and such air can be cooled as by a cooler 110a, to achieve higher density for increased horsepower. Each duct delivers air to a plenum 109 in the head casting 109a, and each plenum supplies air to intakes 108, via valves, of two cylinders. Fuel is injected at 107, at each cylinder. Parabolic recesses are employed, in the combustion chambers, as disclosed herein.

Figure 11:
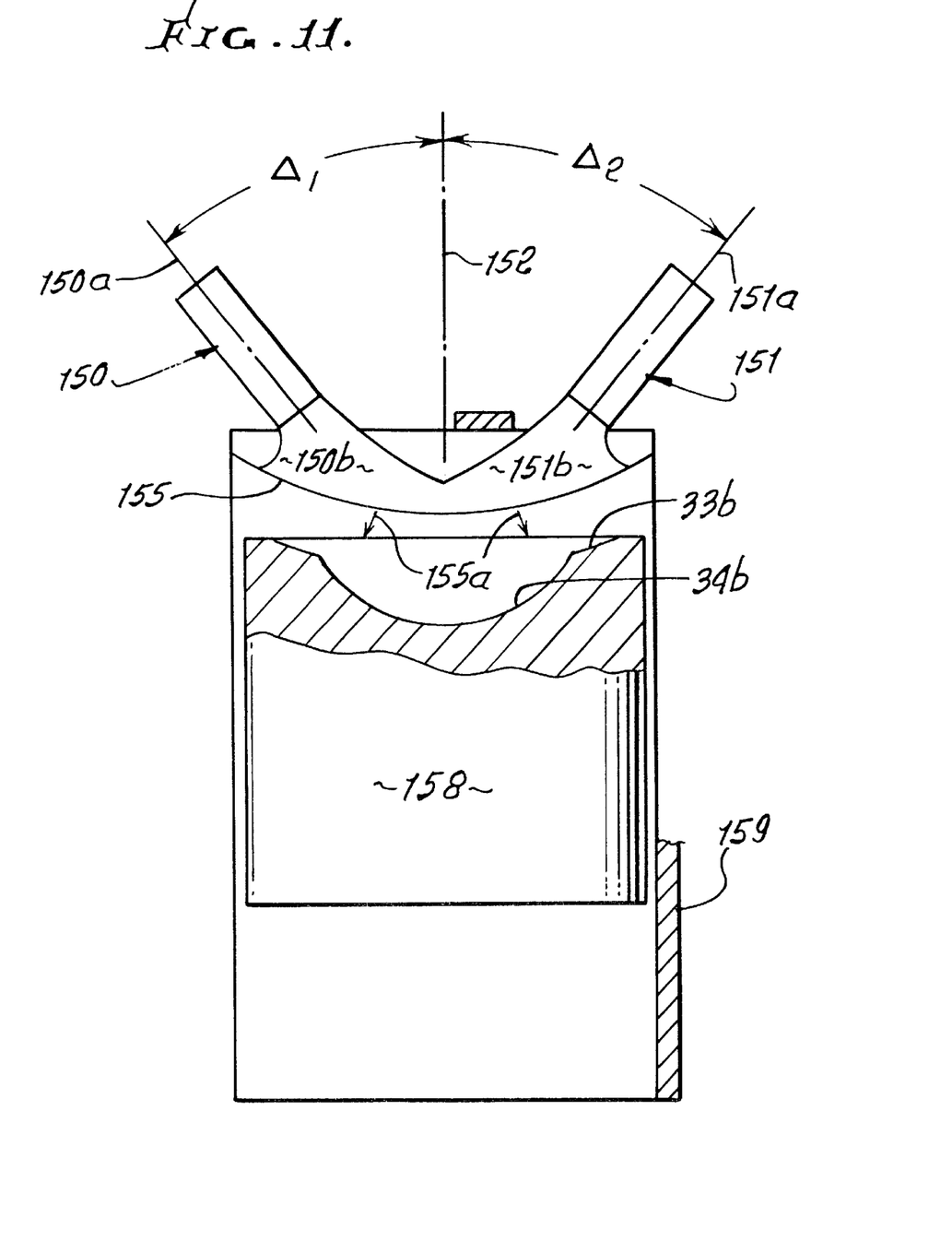
FIG. 11 is a view like FIG. 2a showing a modification.
Figure 12:
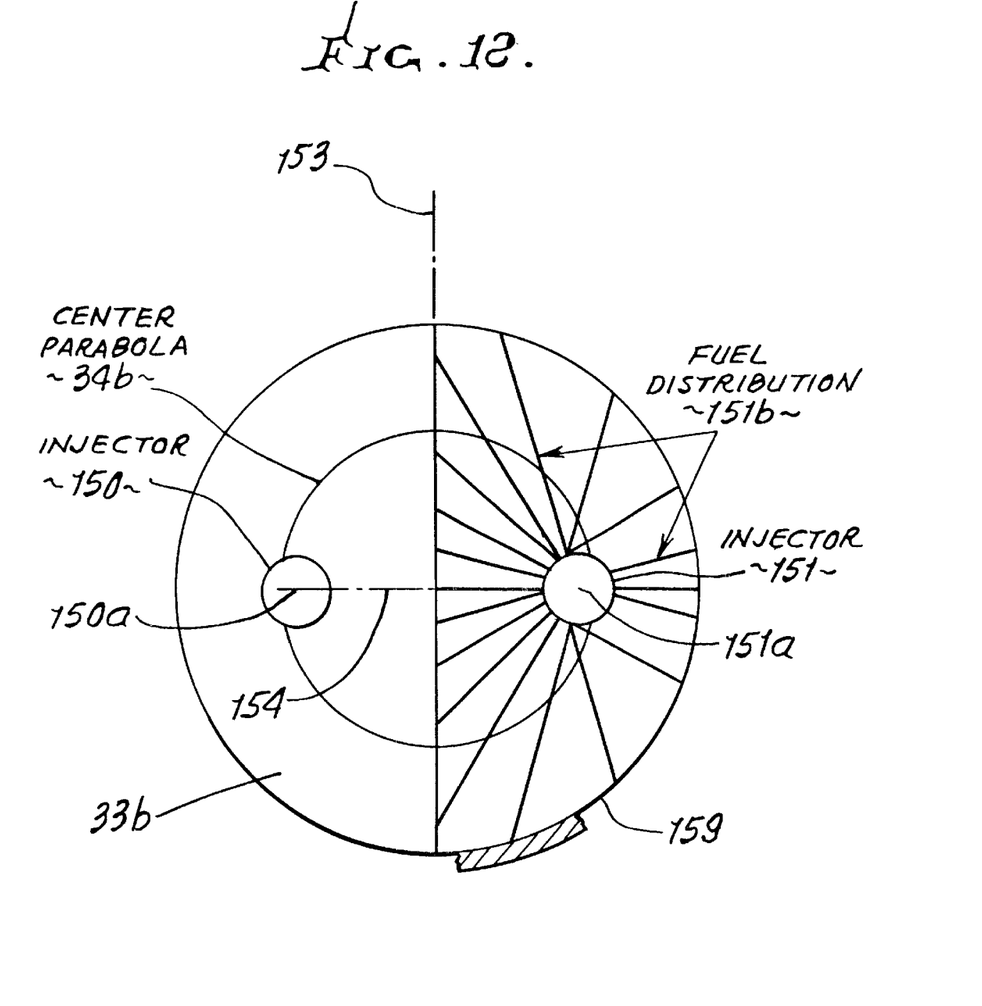
FIG. 12 is a plan view of apparatus as shown in FIG. 11.

FIGS. 11 and 12 show the use of twin and like fuel injectors, as at 150 and 151, in each cylinder. The injectors have axes 150a and 151a, such axes directed at angles $\Delta_1$ and $\Delta_2$ from the cylinder axis 152 and at opposite sides of that axis. The angles $\Delta_1$ and $\Delta A_2$ are typically the same, and are between 30° and 60° from axis 152.

The fuel distribution path for one injector 151, is at the right side of a vertical plane 153 through axis 152, and normal to a plane 154 defined by the two axis 150a and 151a. The fuel is injected at least substantially throughout the right side of the combustion chamber; and the injector 150 likewise injects fuel at least substantially throughout the left side of the combustion chamber. An injected fuel flow path also appears at 150b and 151b, in FIG. 11, that path moving downwardly with the path forward boundary 155 moving downwardly toward two parabolic dished surfaces 33b and 34b, as in FIG. 2a. See arrows 155a. The downward convexity of moving surface 155 correlates generally to the downward convexities 33b and 34b, of the parabolic recesses in the cylinder head, whereby the benefits of better mixing and burning of air and fuel reduced emissions, and more straightening, as referred to above, are enhanced, as by symmetry provided by twin injections. The piston and cylinder are indicated at 158 and 159, and the head at 160.

Figure 13:
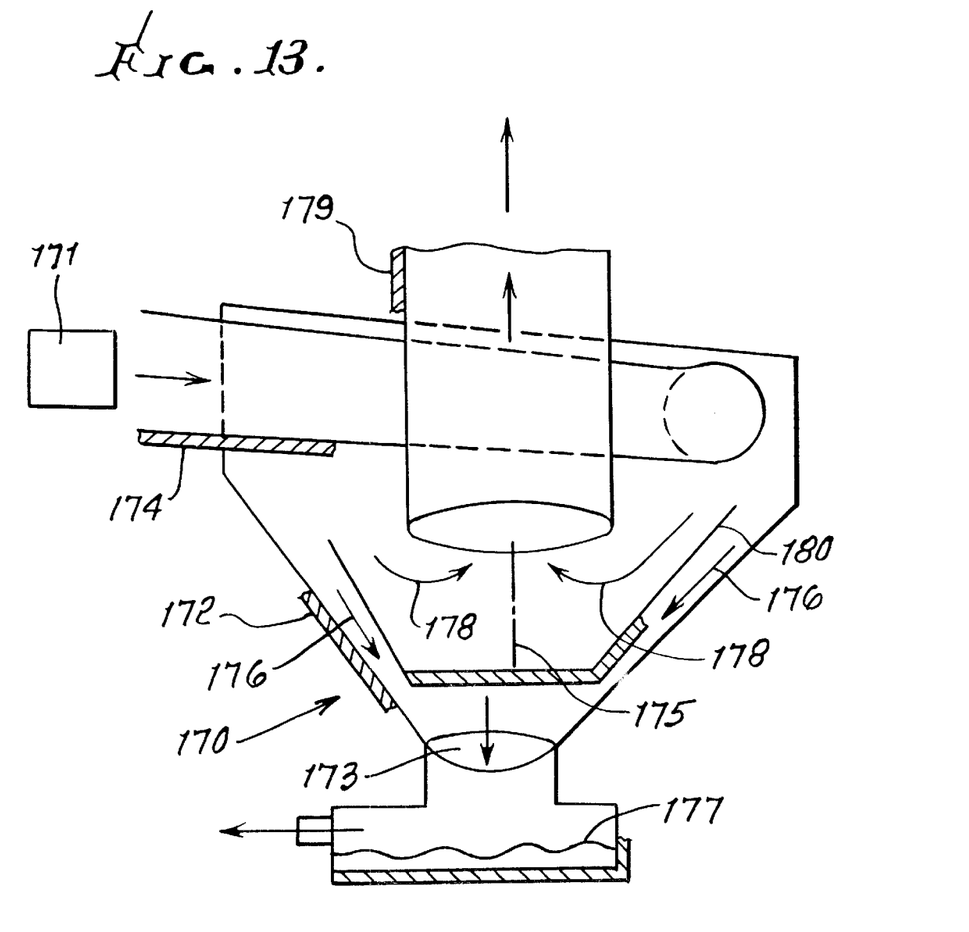
FIG. 13 is an elevation showing separation of air or gas and particulate prior to induction.

FIG. 13 shows the inclusion in the engine systems, as described above, of a cyclone type separator and muffler 170 receiving products of combustion from the engine, as via exhaust valving, schematically indicated at 171. The separator/muffler has a conical shell wall 172, closed at the top, and open at the bottom 173. The inlet pipe 174 from the valving 171 is directed generally tangentially with the shell, whereby gases and particles spin around vertical axis 175, with particles centrifugally thrown outwardly to travel downwardly at 176 to the bottom outlet 173. A heating grid 177 or collector receives the particles from outlet 173, and acts to collect and burn the combustible particles, to eliminate them. The separated exhaust gases travel at 178 back up into an exhaust pipe 179 to exhaust to atmosphere. A conical baffle 180 within the shell interior maintains separation between paths 176 and 178.

Results

2-Parabolas Looped Induction

1. Particulate emissions will be lowered due to complete burning of the fuel.

2 Parabolas

2. NO, will be reduced and proper head shape will allow engine to run with less-heat.

6 Twin Injectors

3. CO and HC will be lowered as fuel will travel 50% less distance to side wall and air will mix better with fuel as the distance for fuel to travel in order to mix with air is cut 50%
4. Power is up 5 to 10%
5. Acceleration will be much better.

By adding all the increases together a smaller engine can be built which by its construction will be more efficient, again lowering emissions.

Further aspects of the invention are summarized below.

Parabola Combustion Chamber Shape

When a parabola shape is used for a recess in a piston or cylinder, as described herein, it will cause parallel travel of the pressure waves as they travel up the bore under compression. As the fuel fires, energy will be reflected by the cylinder head to the parabolic recess in the piston and will be reflected parallel back up the cylinder, spreading throughout the combustion area. This will decrease the differentiation of rich and lean areas in the exhaust gases, mixing being much better, and resulting in lowering the non-combusted emissions.

Reason for Lower Emission

1. The squish band—the fuel is squeezed into the combustion chamber.
2. Center fired spark plug—cuts down on the distance that the fuel or burning fuel has to travel to mix with the air under compression in the combustion chamber. The injected fuel is much heavier than the compressed air and will push the air out of the way. When the piston approaches T.D.C., the air and fuel tend to burn with some areas lean and some areas rich. With the proper control of the burning fuel, much of the differentiation between lean and rich areas can be eliminated by squeezing the air/fuel into the center combustion chamber. The closer to T.D.C. the piston travels, the cleaner the engine will run and the more power it will produce. With twin injectors, the fuel is injected by the two fuel injectors so that the burning fuel zones will meet at the center of the bore and meet at the back walls-forcing the compressed air to mix with the burning fuel. The injection units area directional as described herein.

With twin injectors, the distance the burning fuel travels is about 75 percent less than with a center fire injector. This retards the injection timing and allows more fuel to be added. This in turn produces: more torque and horsepower along with a much cleaner running engine, at a lower RPM.

I claim:

1. In an internal combustion engine having multiple cylinders, each cylinder defining a cylinder wall, and having a cylinder head, there being a piston movable axially within each cylinder to define a combustion zone between the piston top and the cylinder head, each cylinder having intake valve porting and discharge valve porting, the combination comprising
   a) a manifold for delivering air to said combustion zones, via the intake porting at each cylinder,
   b) said manifold including air induction ducts, which are configured with branching to deliver substantially the same-quantity of air to each said porting,
   c) there being at least two of said ducts, said branching including at least two branches for each of said ducts, said at least two ducts being of substantially equal length and said at least two branches being of substantially equal length, and there being an engine driven blower supplying air to said ducts,
   d) the piston top defining a first dished recess configured to receive and direct gases at the time of combustion to flow generally axially toward the cylinder head,
   e) the cylinder head defining a second dished recess configured to receive and direct gases at the time of combustion to flow generally axially toward said piston top,
   f) said dished recesses being parabolic, the intake valve and discharge valve porting intersecting the parabolic recess in the head, the parabolic recess in the piston top subtending both the intake valve porting and the discharge valve porting, said valve porting in the head opening into the parabolic recess in the head and being everywhere spaced from a substantially circular edge of said parabolic recess in the head, whereby the parabolic recess in the piston top directs received gas flow toward said intake and discharge valve porting opening into the parabolic recess in the head,
   g) the recesses being coaxial and parabolic in axial cross section,
   h) said engine having a Diesel engine fuel injector oriented at said head to inject fuel into said combustion zone and toward at least one of said recesses, wherein combustion exploding of the injected fuel causes combustion gases to be received by said recesses and to be directed axially.

2. The combination of claim 1 wherein said induction ducts are looped.

3. The combustion of claim 1 wherein there are six of said ports, there being three ducts each located to deliver air to two of said ports.

4. The combination of claim 1 wherein said first and second recess parabolic shapes have spaced apart foci of different length.

5. The combination of claim 1 including a separator receiving gaseous and particulate products of combustion from the engine cylinder, for removing particulate from the exhaust gases discharged to atmosphere.

6. The combination of claim 5 wherein the separator is a cyclone type separator having a particulate discharge spaced from a combustion gas discharge.

7. The combination of claim 6 including means to treat and reduce particulate received from said particulate discharge.

8. The combination of claim 1 wherein twin injectors are provided to inject fuel toward the center of the combustion zone, and toward said recess.

9. In an internal combustion engine having a cylinder defining a cylinder wall, a cylinder head, and a piston movable axially within the cylinder to define a combustion zone between the piston top and the cylinder head, the head having spaced apart intake valve and discharge valve porting, the combination comprising
   a) manifold means for delivering air to said combustion zone,
   b) the piston top defining a first dished recess configured to receive and direct gases at the time of combustion to flow generally axially toward the cylinder head,
   c) the cylinder head defining a second dished recess configured to receive and direct gases at the time of combustion to flow generally axially toward the said piston top,
   d) said dished recesses being parabolic, the intake valve and discharge valve porting intersecting the parabolic recess in the head, the recess in the piston top subtending both the intake valve porting and the discharge valve porting, said valve porting opening into the parabolic recess in the head and being everywhere spaced from a substantially circular edge of said parabolic recess in the head, whereby the parabolic recess in the piston top directs received gas flow toward said valve porting opening into the parabolic recess in the head, e) the recesses being coaxial and parabolic in axial cross section.

10. In an internal combustion engine having multiple cylinders, each cylinder defining a cylinder wall, and having a cylinder head, there being a piston movable axially within each cylinder to define a combustion zone between the piston top and the cylinder head, each cylinder having intake valve porting and discharge valve porting, the combination comprising a) a manifold for delivering air to said combustion zone, via the intake porting at each cylinder, b) said manifold including air induction ducts, which are configured with branching to deliver substantially the same quantity of air to each said porting, c) there being at least two of said ducts, said branching including at least two branches for each of said ducts, said at least two ducts being of substantially equal length and said at least two branches being of substantially equal length, and there being an engine driven blower supply air to said ducts, d) the piston top defining a first dished recess configured to receive and direct gases at the time of combustion to flow generally axially toward the cylinder head, e) the cylinder head defining a second dished recess configured to receive and direct gases at the time of combustion to flow generally axially toward said piston top, f) said dished recesses being parabolic, the intake valve and discharge valve porting intersecting the parabolic recess in the head, the parabolic recess in the piston top subtending both the intake valve porting and the discharge valve porting, said valve porting in the head opening into the parabolic recess in the head and being everywhere spaced from a substantially circular edge of said parabolic recess in the head, whereby the parabolic recess in the piston top directs received gas flow toward said intake and discharge valve porting opening into the parabolic recess in the head, g) the recesses being coaxial and parabolic in axial cross section, h) said engine having at least two spark plugs with electrodes exposed to said parabolic recess in the head.

\* \* \* \* \*